United States Patent [19]

Baatz

[11] 3,867,840

[45] Feb. 25, 1975

[54] AXIAL OUTLET FLOW TRANSDUCER

[75] Inventor: Wilfried Baatz, Bellevue, Wash.

[73] Assignee: FloScan Instrument Company, Inc., Seattle, Wash.

[22] Filed: May 29, 1973

[21] Appl. No.: 364,231

Related U.S. Application Data

[63] Continuation-in-part of Ser. No. 223,469, Feb. 4, 1972, abandoned.

[52] U.S. Cl. ............................................ 73/229
[51] Int. Cl. ............................................ G01f 1/08
[58] Field of Search .......... 73/229, 230; 415/76, 203

[56] References Cited
UNITED STATES PATENTS

| 909,774 | 1/1909 | Flora | 415/203 X |
|---|---|---|---|
| 3,256,736 | 6/1966 | Lee et al. | 73/229 |
| 3,256,737 | 6/1966 | Sipin | 73/231 R |
| 3,329,021 | 7/1967 | Quesinberry et al. | 73/229 |
| 3,447,373 | 6/1969 | McNabb | 73/229 |
| 3,564,919 | 2/1971 | Varga | 73/258 |
| 3,605,729 | 9/1971 | Liu et al. | 73/229 X |

FOREIGN PATENTS OR APPLICATIONS

| 529,615 | 11/1940 | Great Britain | 73/229 |

Primary Examiner—James J. Gill
Attorney, Agent, or Firm—Christensen, O'Connor, Garrison & Havelka

[57] ABSTRACT

A flow transducer of the turbine or rotor type having a tangential input and axial outlet and zero-drag pickup means. The swirl chamber configuration of the transducer, together with other features, reduces or eliminates the effects of vapor bubbles in liquid flow by creating a spiral or helical flow pattern which separates the bubbles by a cyclonic or centripetal effect and minimizes their influence on rotor response. These bubbles can be trapped in a chamber in the rotor to buoy the rotor, thereby rendering it substantially weightless in the liquid. In addition, one or more baffles or irregularities are interposed within the chamber to disturb the flow in a non-linear fashion increasing with flow rate and compensating for an otherwise non-linear characteristic, thereby rendering the transducer highly linear over a wide range. The baffles are preferably of triangular cross-section wherein the apex is nearest the rotational path of the periphery of the rotor. Besides its linearity and ability to measure accurately the flow rate of liquid-vapor mixtures, the transducer is characterized by a very low pressure drop, simplicity and low cost.

17 Claims, 8 Drawing Figures

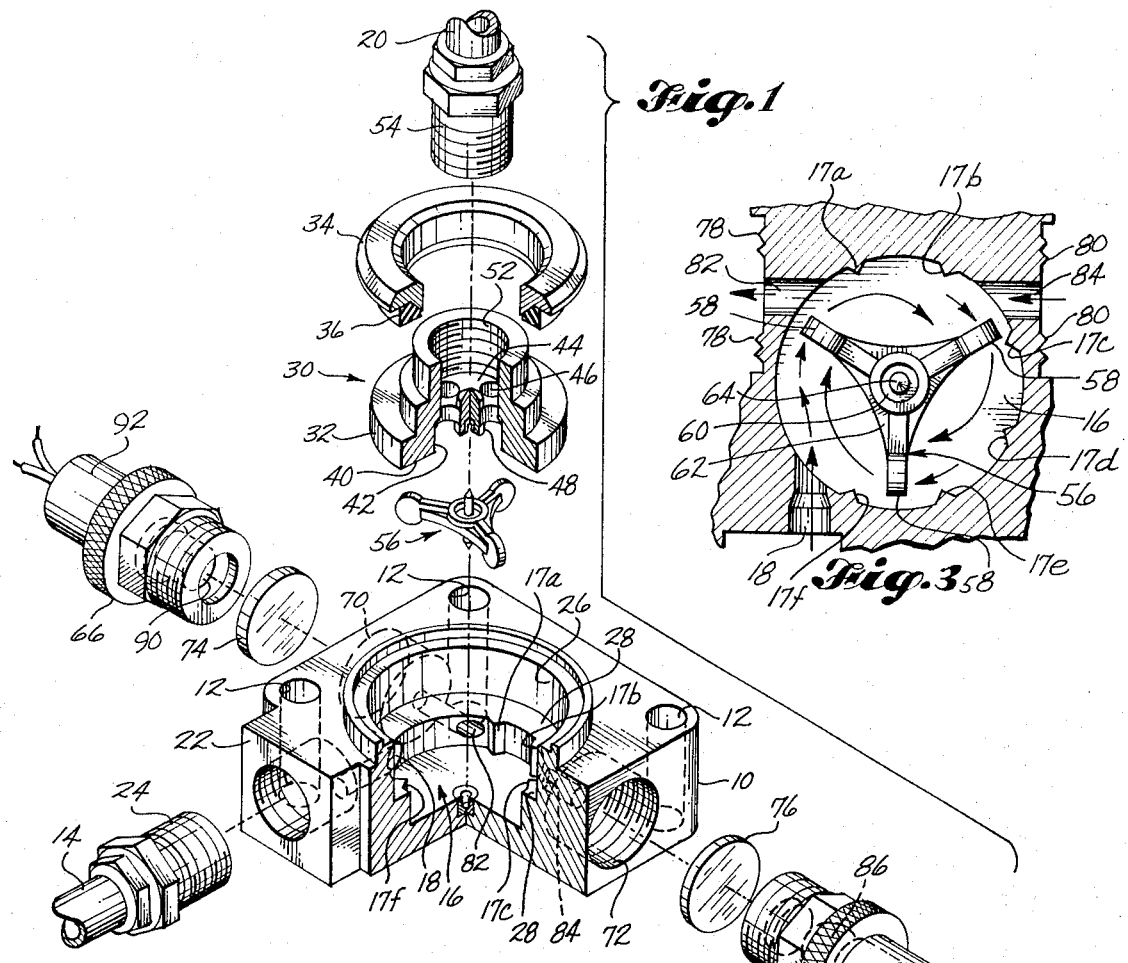
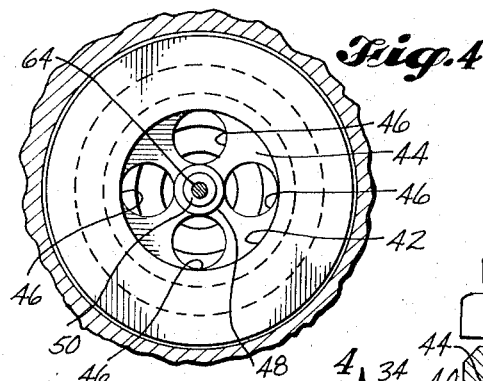
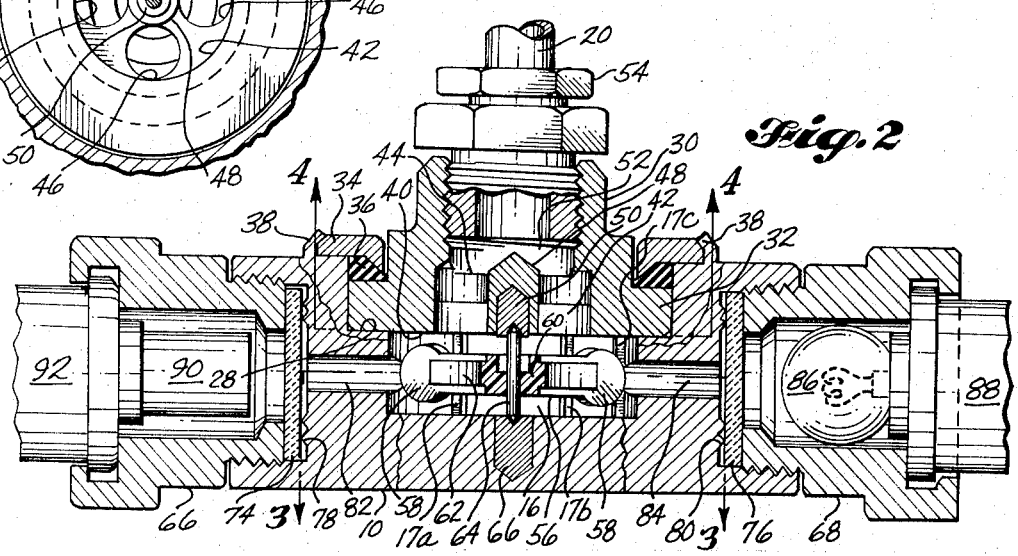

AXIAL OUTLET FLOW TRANSDUCER

CROSS-REFERENCE TO RELATED APPLICATION:

This application is a continuation-in-part of a copending application, incorporated herein by reference, Ser. No. 223,469, filed Feb. 4, 1972, now abandoned, entitled "Axial Outlet Flow Transducer." Another application entitled "Flow Transducer," Ser. No. 163,166, filed July 16, 1971, now abandoned, was copending with the aforementioned application and is incorporated herein by reference.

BACKGROUND AND SUMMARY OF THE INVENTION:

Many prior art flow meters or flow transducers, particularly those of the rotor (or impeller) or turbine type, have been subject to the problem of vapor or bubble effects which disturb their operation and accuracy. Further, they have been characterized by high cost, non-linearity and limitations upon the kinds of fluids in which they may be operated successfully.

Anomometer or heating element type flowmeters rely upon a temperature differential at points spaced within the flow upstream and downstream of a heating element. While this type is not particularly affected by vapor, the use of a large enough heating element for accurate results may cause vaporization of the fluid and consequences downstream of the measuring location. Orifice type flowmeters have included the float type variable orifice area and the type in which the pressure drop across a fixed orifice is measured. Still another type of flowmeter is the swirl meter type, based on the vortex precession principle. It has no moving parts and measures the sound or vibration created by a gas or fluid moving rapidly through a swirl chamber. Turbine or rotor type flowmeters of the electromagnetic pickup type, in which the rotor made wholly or partly of metal forms a part of the electromagnetic output signal system, are characterized by excessive drag or resistance to flow. Electromagnetic flow transducers which use an electromagnetic field to induce a current through the moving liquid cannot be used with hydrocarbons such as gasoline, which are nonconductive.

All of the aforementioned devices have disadvantages which render them unsuitable for low cost, accurate measurement of the flow of hydrocarbon fuels, as well as various other kinds of fluids.

The art has failed to produce a suitable flow transducer for liquid flows in the broad range of one-half to fifty gallons per hour. This invention successfully fills the need for a transducer applicable in this range (though not limited to it) and characterized by low pressure drop, the ability to operate on liquid vapor mixtures, a highly linear output over its entire operating range, and very low cost, due to its simplicity.

An improved turbine or rotor type flow transducer is disclosed in the aforementioned U.S. Pat. application of this inventor, Ser. No. 163,166, filed July 16, 1971, titled "Flow Transducer," now abandoned. That device incorporates a photoelectric pickup and a rotor assembly having a specific gravity substantially equal to that of the fluid, the flow of which is being measured, thereby reducing resistance of the rotor and pickup system to fluid flow to an insignificant and virtually unmeasurably small amount. It operates successfully when no vapor is present in the fluid and as long as its non-linear output can be calibrated out by the output instrumentation.

The flow transducer in accordance with the present invention seeks to overcome aforementioned problems of prior art devices. It incorporates some of the features of the device shown in the aforementioned copending patent application, together with other unique features which distinguish it dramatically from other flow transducers in terms of pressure drop, linearity, low cost and other aspects and advantages.

Aspects of the invention which are important to its operation and distinguish it from prior flow transducers are its combination of tangential inlet and axial outlet creating a helical flow condition enabling bubbles in effect to by-pass the rotor. In addition, the invention employs one or more turbulence-creating surfaces or baffles around the periphery of the chamber. As will be seen, these features have advantages independent of one another and can be separately employed in other flowmeter arrangements, but when combined they cooperate to provide a highly linear flow transducer having capabilities and advantages not heretofore achieved.

Where vapor is contained in the fluid whose flow is being measured, a turbine type flow transducer having a tangential inlet and tangential outlet has been unsuccessful. Since the pressure around the periphery of the flow chamber is greater than at the center, the vapor bubbles tend to congregate at the hub of the rotor and remain undispersed by exit of fluid from the chamber. In cases of excessive vapor the chamber may become so occupied by bubbles that the rotor will stop altogether. In any event, the collection of vapor tends to interfere with accurate operation of the transducer. Elaborate means have been attempted to eliminate vapor from fluid flow prior to entry into the flow transducer, including by-pass vapor extractors and various other devices. However, these have added expense and complexity and have been otherwise unsatisfactory.

The tangential inlet axial outlet arrangement of this invention, designed to overcome the aforementioned problems, has proven quite successful. It appears that any bubbles which enter the chamber are immediately withdrawn from the peripheral flow within the chamber and are driven to the center by the pressure differential, so as to not interfere with the influence of the normal peripheral flow upon the speed of the rotor. That is, the axial outlet draws off the vapor so that it in effect by-passes the rotor and has minimal influence thereon. Additionally, in one of the preferred embodiments advantage is derived from the presence of vapor or bubbles in the fluid stream. Some of the vapor forced inwardly by the pressure differential is trapped in a vapor chamber in the bottom portion of the rotor. The chamber is so sized relative to the fluid as to cause the rotor to be buoyed upwardly to an extent whereby its composite specific gravity is substantially equal to the fluid. Thereby the friction in the rotor bearings is substantially reduced.

The preferred embodiments are specifically structured to take advantage of this discovery. Briefly, a flow transducer in accordance with the invention is of the turbine type having an annular flow chamber, a bladed rotor mounted within the chamber, electrical indicator means adjacent to the chamber for detecting the frequency of rotation of the rotor, input means for injecting fluid into the chamber substantially tangentially to establish flow around the chamber, outlet means located substantially axially of the chamber to establish a helical flow pattern toward the center thereof, flow disturbing means in the chamber comprising at least one projection on the outer wall of the chamber, the projections having at least two side walls extending inwardly relative to the outer wall and intersecting a radial chamber to form an edge located adjacent the peripheral portion of the path defined by the periphery of the rotor blades when the rotor is rotating, the flow disturbing means causing the relative rotational speed of the rotor to be reduced at high rotational speeds.

The chamber preferably includes a primary portion of substantially cylindrical shape occupied by the rotor and a secondary portion offset axially from the primary portion and having a lesser diametral dimension than the primary portion, with the outlet means coupled with the secondary portion. This secondary space provides a collection point for bubbles and reduces turbulence in the low pressure region just preceding the outlet at the center of the chamber, thus more effectively removing the bubbles and outlet turbulence from interference with the rotor. Since axially located bearings are required to support the rotor within the chamber, the outlet openings are preferably located around the bearing adjacent to the secondary portion of the chamber.

The indicator means in accordance with the invention preferably comprises means for directing a beam of energy along a path intersected intermittently by the rotor blades and means positioned to receive the energy beam and detect interruptions thereof. In addition, the rotor assembly is preferably constructed to have specific gravity equal to that of the fluid, so that it floats substantially weightlessly therein. These two features in combination with the vapor chambered rotor impart zero-drag characteristics to the transducer, especially important at low flow rates.

As previously indicated, the invention also resides in the intentional creation of turbulence within the fluid chamber by interposing a baffle or other irregularity therein. As is well known to those skilled in the art, when actual flow rate is plotted on a vertical axis against rotor speed on a horizontal axis, the output characteristic of a turbine type flowmeter levels off in a curved, non-linear fashion. For some purposes the output indicator scale can be calibrated to eliminate the effect of this nonlinearity, but for many other purposes this is not a solution. Attempts in the past to eliminate non-linearity have resulted in very complex and expensive flowmeters using sophisticated electronics to remove the non-linear response.

The introduction of one or more irregularities in the form of baffles or angled surfaces on the periphery of the flow chamber creates a flow condition the effect of which decreases non-linearity with flow rate so as to compensate for an otherwise non-linear characteristic. Introducing such irregularities into the chamber of the flow transducer disclosed in the aforementioned copending application is also found to have the effect of increasing its linearity.

In the present invention the irregularities are in the form of elongated protrusions from the peripheral walls of the flow chamber. The protrusions have a triangular cross-section and are prism shaped. The side walls of the protrusions generally extend inwardly and intersect with each other to form an edge generally parallel with the rotational axis of the rotor. Accordingly, one or more of these protrusions or irregularities are positioned on the periphery of the chamber adjacent to the ends of the rotor blades to produce rotor-inhibiting turbulence in the flow pattern around the chamber.

This feature is used to greatest advantage in an axial output flow transducer as disclosed herein, wherein the input means is positioned to inject fluid into the chamber substantially tangentially thereof and the outlet means is positioned substantially axially of the chamber to establish a helical flow pattern. The chamber itself preferably includes primary and secondary portions as previously discussed, with the rotor and the irregularities located in the primary portion, the secondary portion serving to collect any bubbles entering the chamber.

The invention also resides in certain details of construction hereinafter described, including the physical cooperation of the primary features already discussed. These and other features, objects and advantages of the invention will become more apparent from the following detailed description of the invention with reference to the accompanying drawings.

BRIEF DESCRIPTION OF THE DRAWINGS:

A better understanding of the present invention will be derived by reading the ensuing specification in conjunction with the accompanying drawings wherein:

FIG. 1 is an isometric, exploded and partially sectioned view of an axial outlet flow transducer in accordance with the invention;

FIG. 2 is a side elevation view of the flow transducer of FIG. 1, shown assembled, sectioned partially in an axial plane and partially in the plane of the indicator means;

FIG. 3 is a fragmentary, partially sectioned top view, taken along lines 3—3 of FIG. 2, with the rotor shown in full view;

FIG. 4 is a fragmentary, partially sectioned bottom view of the axial outlet features of the flow transducer, taken along lines 4—4 of FIG. 2;

Figure 5:
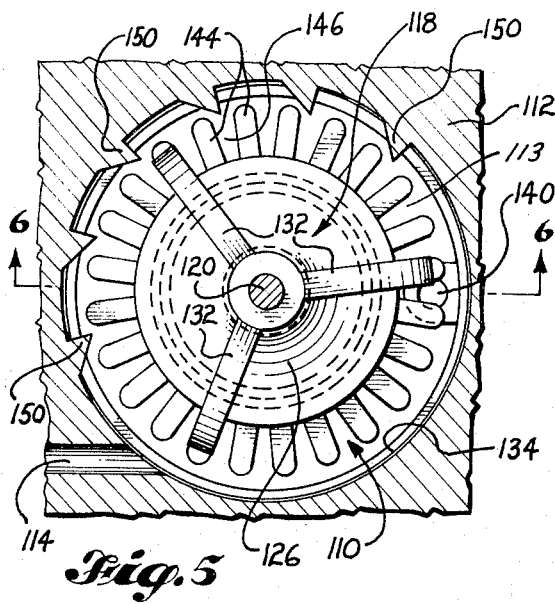
FIG. 5 is a fragmentary, partially sectioned top view of another embodiment of the rotor and flow chamber of the present invention, taken substantially along section line 5—5 of FIG. 6.

DETAILED DESCRIPTION OF THE PREFERRED EMBODIMENT:

While the features of this invention are particularly adapted for fuel flowmeters, and the illustrated embodiments were developed for miles per gallon indicators and the like, the principles disclosed are applicable to measuring flow of other types of fluids as well. The general applicability of the principles of the invention will be recognized by those skilled in the art.

In accordance with the invention the specific flow transducer embodiment illustrated is designed to achieve linearity not heretofore possible except in very expensive and complex flowmeters. In addition to its linearity and low cost, the transducer according to the invention is characterized by simplicity, reliability and maintenance free operation.

The housing 10 comprises a single rectangular piece cast of zinc alloy or the like and in which the fuel flow chamber and various passageways and openings are cast or machined. Four holes 12 in the corners of the housing are provided for mounting the unit on a suitable bracket beneath the hood of a car, or in a boat, or in any other suitable location in which the fuel line 14 and electrical wiring is or can be located. The housing 10 is substantially rectangular as seen from the top and as seen in cross-section in FIG. 2. The fuel flow chamber 16 cast in the center of the housing is substantially circular and receives fuel through a tangential inlet passageway 18, establishing circular flow around the chamber as shown in FIG. 3. The housing includes an internally threaded projection 22 into which the externally threaded fitting 24 is installed to connect input line 14 to inlet passageway 18. Fuel is delivered from the flow chamber 16 to the axially directed outlet line 20 through openings in fittings described hereinafter. The axial location of the outlet, together with the circular flow already established creates a swirl or helical flow pattern. The flow pattern is affected by turbulence-inducing baffles 17 (17a . . . 17f) spaced around the chamber and discussed in more detail hereinafter.

The cavity in the housing 10 forming the cylindrical chamber 16 includes a larger cylindrical opening 26 above the shoulder 28 to receive the fitting 30. The fitting 30 has a lower flange portion 32 which, when installed, is seated upon the shoulder 28 of the housing and is held therein by an annular ring fitting 34 and an interposed O-ring 36. The ring fitting 34 has an angled lip which is gripped and held against the housing by an annular flange 38 formed on the housing around the cavity 26. To install the ring fitting the flange 38 is crimped or rolled against ring fitting 34 as shown in FIG. 2.

The entire fuel flow chamber actually consists of the primary portion 16, defined by the casing 10 and the lower flat face 40 of the fitting 30, together with a secondary portion 42 defined by the internal structure of the fitting 30 and axially offset from the primary chamber 16. (While shown with the secondary portion above, the transducer may be tilted or otherwise oriented without disturbing its effectiveness for most purposes.) A web portion 44 of the fitting with four outlet holes 46 drilled therein (FIG. 4) supports a centrally located bearing holder 48 in which an axial bearing 50 is installed. Above the web portion 44 is an internally threaded axial cavity 52 into which the externally threaded fitting 54 is installed to connect the outlet line 20 to the fuel flow chamber.

The rotor 56 mounted within the primary flow chamber 16 includes three blades 58 which are rounded on the ends and extend from a hub portion 60 at 120° angles to one another. Curved web portions 62 impart greater strength and rigidity to the blades. The rotor is permanently mounted on an axial shaft 64, the pointed ends of which are held between the upper and lower bearing elements 50 and 66. The bearings and shaft, preferably of high grade steel or other appropriate hard substance, provide a virtually friction-less mounting for the rotor. The rotor is preferably constructed of a light weight material so that the rotor assembly, including the shaft, has a specific gravity substantially equal to that of the fluid, so that the assembly is suspended weightlessly within the fluid to rotate freely with no axial load on the bearing surfaces. Examples of materials having specific gravity suitable for measuring the flow of gasoline, for example, include polypropylene and methylpentene.

The circular motion of the rotor is converted to a signal indicating flow rate by a photoelectric pickup system, in the preferred embodiment shown. Aligned on opposite sides of the housing 10 are substantially identical fittings 66 and 68, which are threaded into corresponding cavities 70 and 72 in the housing. Fitted within each of these cavities are respective windows 74 and 76 made of Teflon or other suitable material capable of transmitting a beam of light or other energy. These windows are also preferably soft enough to form a seal when the fittings are tightened against them, and circular ridges 78 and 80 are provided in each of the receiving cavities 70 and 72, to be embedded into the windows as they are tightened against the ridges by the respective fittings.

The windows 74 and 76 thus seal two small passageways 82 and 84 leading to and from the circular chamber 16. These passageways are aligned with each other and with the cavities 70 and 72 along a path located in the plane of rotation of the rotor 56, but offset from its axis of rotation, as can be seen in FIG. 3, so that the rotor blades 58 only intermittently intersect the path. Each blade fully blocks the path between the passageways, but only one blade is interposed in the path at a time.

Mounted in the right hand fitting 68 is an illuminator or bulb 86 suitably held in a flexible snap-in socket unit 88, and mounted in the opposite fitting 66 is a detector unit 90 suitably mounted in a snap-in holder 92. While the exact nature of the bulb or radiant energy source 86 and the detector 90 are not critical to the invention, they may simply comprise a bulb and photosensitive resistor or transistor, the electrical conductivity of which is affected by the intermittent reception of the light beam from the bulb. Thus when suitably energized the detector 90 provides an electrical signal having a frequency indicating the speed of rotation of the rotor 56.

From the foregoing description it will be observed that the swirl or helical flow pattern is initiated by injection of fluid from passageway 18, setting up circular flow around the primary chamber 16. The rounded ends of the blades 58 are positioned directly in this peripheral flow, substantially confined in the annular region below the flat face 40 of fitting 30. The rotor, as seen in FIGS. 2 and 3, actually occupies very little of the total space within the chamber and has negligible effect upon the flow pattern therein. The resulting swirl upwardly toward the outlet holes 46 in the top of secondary portion 42 of the chamber causes a pressure gradient which decreases from the periphery of the chamber toward the center and toward the outlet. Any bubbles entering the chamber do not remain in the peripheral flow but are immediately carried toward the center and upwardly in a spiral toward the outlet. The secondary portion of the chamber serves to collect the bubbles, allowing some periodic buildup in case of major vapor content, without interference with the rotor blades. The blades themselves are shaped so that they are influenced more by the peripheral flow than by that in the central region of the chamber. Thus the transducer can operate effectively in spite of the presence of significant amounts of vapor in the fluid whose flow is being monitored. This is particularly advantageous for hydrocarbon fuels, since the mixtures they often contain and the temperatures involved in their use and consumption typically result in production of bubbles in the fuel line in which the flowmeter is installed.

As previously noted, irregularities in the flow chamber which break up the normally smooth flow around its periphery appear to compensate in non-linear fashion for the otherwise non-linear characteristic of the turbine type flowmeter. While different numbers, shapes and sizes of irregularities, obstructions or baffles disturbing the normal flow of fluid around the periphery of the chamber result in differing degrees of linearity, the arrangement shown has been found to produce highly linear results. The prism shaped baffles or projections 17 (17a . . . 17f) spaced circumferencially around the circular peripheral face of the chamber 16 cause a turbulent condition in the peripheral region of the chamber. Their effect in the embodiment illustrated is non-linear, increasing with flow rate in a fashion which compensates for the normal non-linearity of this type of flowmeter, rendering it linear within plus or minus two percent across a range of one to 30 gallons per hour (gasoline).

It is advantageous to avoid locating a baffle adjacent to the input opening 18. The circular or spiral flow of the fluid should be well established in the chamber prior to distortion by the first baffle 17a to achieve linear results. While the particular arrangement shown has been found successful, the invention is not limited to the illustrated shape, number, size or location of the irregularities, nor even to projections into the chamber, since depressions in the walls of the chamber may be utilized to create a turbulent flow condition as well.

In addition, the configuration of the rotor itself may be varied to achieve different degrees of linearity, and to achieve different results for different ranges of flow rates. For example, a rotor having blades whose ends are square, rather than rounded, gives better results at higher flow rates, from five to 50 gallons per hour, but exhibits some non-linearity at flow rates below three gallons per hour, where rounded blades give better results. Other modifications within the scope of the principles disclosed will be recognized by those skills in the art.

Figure 6:
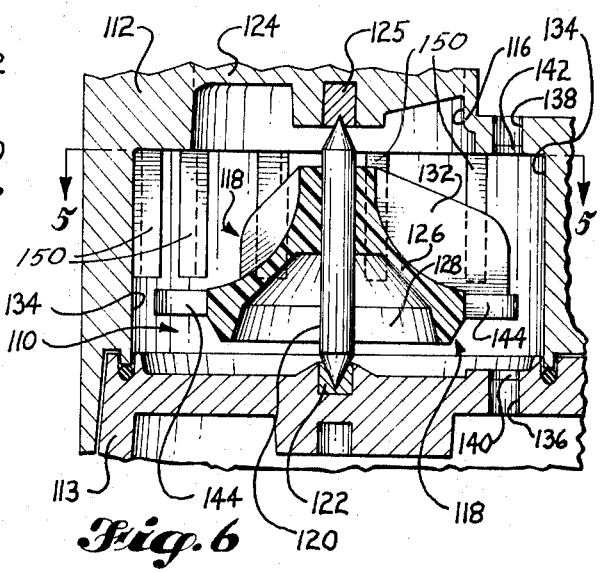
FIG. 6 is a fragmentary, sectional view of the rotor and flow chamber showing the frequency sensing openings of the embodiment of FIG. 5 as taken along section line 6—6 of FIG. 5.

Referring now to FIGS. 5 and 6, a second embodiment of the invention is illustrated. In this embodiment a primary fuel flow chamber 110 of generally the same configuration as fuel flow chamber 16 in the first above-described embodiment is situated in a housing 112. An inlet channel 114 provides a flow path for entrance of fluid to be measured into the chamber 110. The channel 114 is situated similarly to channel 18 of the first embodiment and causes fluid to enter generally tangentially into the cylindrically shaped chamber 110. A second chamber 116 is axially offset in the housing 112 above the primary chamber 110. The location of secondary chamber 116 is similar to the location of the secondary chamber 42 in the first embodiment. The fluid outlet from the chamber 110 is in fluid communication with secondary chamber 116.

A rotor, generally designated 118, is mounted in the primary chamber 110. The shaft 120 of the rotor 118 rides in a bearing 122 situated in a bottom section 113 of the casing 112. A web portion 124 extends across the secondary chamber 116 and has a bearing 125 therein for receiving the upper end of the shaft 120. In this manner, the rotor 118 is mounted for rotation about an axis coincident with the axis of primary chamber 110. The rotor 118 has a generally bell-shaped middle portion 126 which defines a bubble chamber or cavity 128 opening to the bottom of the rotor 118. In the preferred form of the invention three blades 132 extend radially outwardly from the side portions of the bell-shaped middle ortion 126 to a spaced distance from the peripheral side walls 134 of the primary chamber 110.

The cavity 128 formed by the bell-shaped central portion 126 of the rotor 118 provides a region in which vapor bubbles and other gas present in the liquid entering the chamber 110 can be trapped and retained therein. Excess vapor and gas entering the chamber 110 is expelled in a manner similar to that described in relation to the foregoing embodiment. The purpose of entrapment of vapor in the chamber 128 is to buoy the entire rotor 118 upwardly in the chamber 110 to an extent such that the rotor 118 will be virtually weightless in the liquid in which it is rotating. In this manner, the friction produced by the axial forces of the shaft in the bearing in the blocks 122 and 125 is minimized and essentially reduced to nothing. It has been found that it is very difficult and almost impossible to match the specific gravity of the rotor to the specific gravity of the liquid even though it is constructed from a light polymer with a central steel shaft. In almost all present rotor-shaft combinations feasible for use with motor fuel the specific gravity of the rotor shaft combination exceeds that of the liquid. By designing the rotor such that vapor is entrapped in the cavity 128, the entire rotor 118 is buoyed upwardly to an extent whereby the composite specific gravity, when the buoyancy of the vapor in the cavity 128 is taken into account, is substantially equal to the specific gravity of the fluid flowing through chamber 110.

Two passages 138 and 136 in the housing 112 and bottom section 113, respectively, open into the primary cavity 110 adjacent the peripheral wall 134 of chamber 110. Passage 136 extends through the housing portion 113 into the primary cavity chamber 110 from the bottom. The second passageway 138 extends from the upper portion of the housing 112 downwardly into the primary chamber 110. Optically transparent windows 140 and 142 close off the inner ends of the passages 136 and 138, respectively. The passages 136 and 138 provide means by which a light beam can enter and leave the primary chamber 110 similar to the passages and windows 82 and 84 in the embodiment described above.

The peripheral edge of the rotor 118 contains a plurality of equally spaced ears or tabs 144 separated by spaces 146. The tabs 144 and intervening spaces 146 are so situated on the rotor 118 that they alternatively intersect a light beam entering through passageway 136 and leaving through passageway 138. In this manner the light beam is chopped or interrupted at a frequency proportional to the rotational velocity of the rotor 118. A light source and detector the same as that used with the first embodiment can be employed with this embodiment. It has been found that a higher number of interruptions of a light beam per revolution of the rotor allows greater accuracy in the response from the rotor 118 at low rotational velocities.

In the embodiment of FIGS. 5 and 6 a plurality of angular protrusions 150 are situated on and extend inwardly from the peripheral wall 134 of the primary chamber 110. The protrusions 150 have a triangular cross section and are prism shaped as those of the previously described embodiment. The protrusions 17 (FIG. 3) of the first embodiment are in the form of a substantially equilateral triangle with the apex of the triangle situated nearest the locus of points defined by the periphery of the blades 58 on the rotor 56. The protrusions 17 extend from the top to the bottom of the primary chamber 16 along the peripheral walals.

In the present embodiment of FIGS. 5 and 6 the protrusions 150 extend from the top of the primary chamber 110 to a spaced distance from the bottom of the chamber 110. The space between the bottom of the protrusions 150 and the bottom of the chamber 110 provides clearance between the tabs 144 and the protrusions 150. In this manner the protrusions do not significantly affect the flow of fluid through the chamber 110 but yet allow the positioning of the light detection passages 136 and 138 inwardly adjacent the peripheral wall 134 of the primary chamber 110. The cross-section of the protrusions 150 in the present embodiment are substantially right triangles. The hypotenuse of the right triangles extend from the apex of the protrusions 150 toward the peripheral wall 134 in the direction of flow around the chamber 110. A leg of the right triangle forming the cross-section of the protrusion 150 extends inwardly substantially on a radius of the chamber 110 toward the axis of the rotor 118. This leg and the hypotenuse of the triangle intersect to form an apex situated adjacent the path defined by the periphery of the blades 132 as the rotor 118 rotates about the axis of its shaft 120. Since the cross-section of each of the protrusions is constant along the axial dimension of the chamber, the locus of the apexes of all the right triangular cross-sections along the axial dimension forms an edge. This edge is substantially parallel to the rotational axis of the shaft 120.

The protrusions 150 serve to create turbulence within the primary chamber 110 to provide increased linearity in the rotational response of the rotor 118 through various flow rates. It has been found that the right triangular shaped protrusions 150 in the present embodiment (and the equilateral triangular shaped protrusions 17 in the embodiment of FIGS. 1 through 4) are much more effective to form the proper turbulence patterns within the chamber 110 to produce a substantially linear response. This phenomenon is graphically shown in FIGS. 7 and 8.

Figure 7:
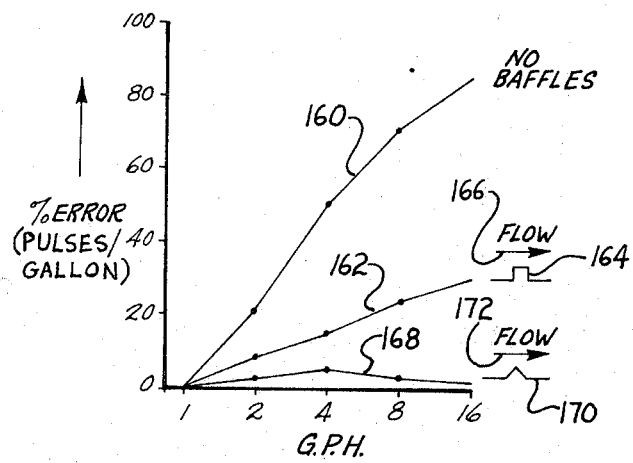
FIGS. 7 and 8 are graphs which illustrate the percent change in response of the rotor to varying flow rates, showing the efficacy of the turbulence producing irregularities of the present invention.

FIG. 7 is a graph of several types of turbulence-producing devices of different cross-sectional shapes. The graphs of FIG. 7 are curves resulting from actual tests run with the chamber and rotor as shown in the embodiments of FIGS. 1 through 4. In FIG. 7 the ordinate has a scale of percent error of pulses received from a light beam detection device. The abscissa has a scale of flow rate from one gallon per hour through eight gallons per hour. The top curve 160 illustrates the error in response when flow rate is varied from 1 to 16 gallons in a chamber having no turbulence-producing devices. As can be seen, the percent error from 1 gallon per hour to 16 gallons per hour increases from 0 percent to above 80 percent. In order to correct this non-linearity in response, the prior art has gone to sophisticated electronic signal conditioners to provide a linear electronic output which is meaningful across the entire flow range. The second curve 162 illustrates the nonlinear response, although somewhat improved over the curve 160, of a chamber having a plurality of rectangular shaped turbulence producing devices. Such a turbulence-producing device is schematically illustrated at 164 with the arrow 166 showing the direction of flow across the turbulence-producing device. The curve 162 illustrates an error of 30 percent over the tested flow range. The curve 168 shows the surprising results obtained when a plurality of turbulence-producing protrusions of equilateral triangular shape is employed. This protrusion shape is schematically represented at 170 with arrow 172 indicating the direction of flow. As can be seen, utilization of the triangular-shaped protrusion 170, the percent error is decreased to less than about 5 percent in the flow range from 1 to 16 gallons per hour. The protrusion 170 represents a plurality of triangular shaped protrusions substantially identical to those illustrated in the embodiment of FIG. 3.

Figure 8:
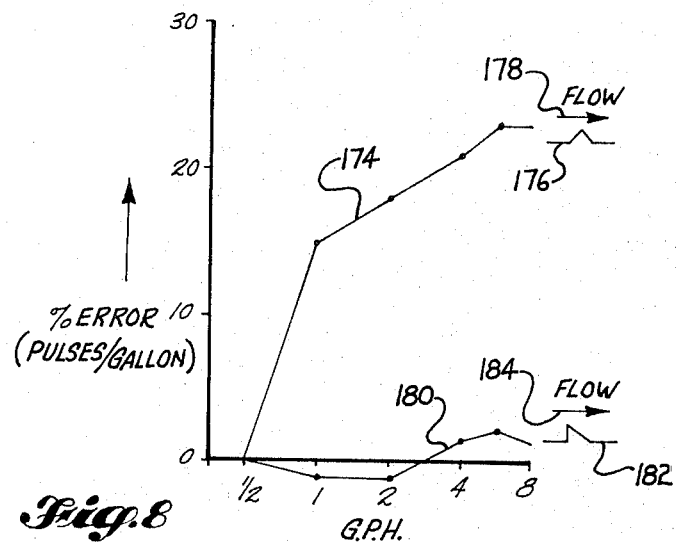

Turning now to FIG. 8 a graph having an abscissa from 0.5 gallons per hour and an ordinate showing percent error in response similar to that of FIG. 7 is illustrated. In FIG. 8 the curve 178 illustrates the percent error derived when a protrusion of equilateral triangular shape (in cross-section) is employed in the flow environment substantially identical to chamber 110 of FIGS. 4 and 5, utilizing the rotor 118 described in conjunction therewith. As can be seen, the rotor 118 of the latter embodiment is much more streamlined to flow than is the rotor 56 of the first embodiment. Fluid entering the chamber 110 encounters much less resistance to flow across the rotor and upwardly and outwardly through the secondary chamber 116 than does the fluid flowing through the chamber in the first embodiment. This is due primarily to the sloped side walls of the bell-shaped central portion 126 of the rotor 118. Furthermore, the lessened resistance to rotation provided by the vapor trapped in the cavity 128 which buoys the rotor 118 upwardly also allows the rotor 118 to rotate more freely. Thus, it was found that although the equilateral triangular shaped protrusions, represented schematically by 176 with the direction of flow thereacross represented by arrow 178, were significantly better than a chamber having protrusions of square cross-section or having no protrusions, the percent error increased significantly at low flow rates because of the change in rotor shape. Thus, further modification to the protrusions became necessary. It was surprisingly found that protrusions substantially identical to protrusions 150 (FIGS. 5 and 6) created a turbulence pattern which caused the rotor to slow down at increased flow rates. The curve 180 of FIG. 8 represents the percentage error derived from the rotor/chamber combination of the latter embodiment. The right triangular shaped protrusions are schematically represented at 182 with the direction of flow thereacross indicated by arrow 184. Thus, it can be seen that the right triangular shaped turbulence producing protrusions reduce the percentage error in the latter embodiment significantly down to flow rates one-half gallon per hour through flow rates exceeding 8 gallons per hour. It should be noted that the percentage error shown by the curve 174 is approximately the same as that shown in curve 168 when considered in the 1 to 8 gallon range. However, when lower flow rates which are very desirable for many applications are encountered, the equilateral triangular shaped protrusion 176 did not perform as desired. Thus, the most preferred embodiment for low flow rate applications is the right triangular shaped protrusion 182, the response curve of which is illustrated in curve 180 of FIG. 8. From ½ to 8 gallons per hour the curve 180 shows an error of less than 2.5 percent.

The present invention has been described in relation to two preferred embodiments. It is to be understood that one of ordinary skill in the art could make various changes, substitutions of equivalents and other alterations without departing from the concept disclosed and described herein. It is therefore intended that the present invention be limited only by the definition contained in the appended claims.

What is claimed is:

1. A flow transducer comprising:
   a. housing means defining a flow chamber having a wall, said wall being circular in cross-section;
   b. a rotor having a central rotational axis and having a plurality of blades extending outwardly from said central axis, and means mounting said rotor in said chamber for rotation about said axis responsive to fluid flow in said chamber;
   c. means in said housing for detecting the angular frequency of rotation of said rotor;
   d. inlet means in said housing means for injecting fluid into said chamber substantially tangentially to the wall of said chamber to establish flow around said chamber;
   e. outlet means located to discharge fluid from said chamber; and
   f. flow disturbing means in said chamber comprising a plurality of projections on the wall of said chamber, said projections having at least two side walls extending inwardly relative to the wall of said chamber and intersecting each other to form an edge located adjacent the peripheral portion of the path defined by the periphery of said blades when said rotor is rotating, said projections being triangularly shaped in cross-section, said flow disturbing means causing the rotational speed of said rotor to be reduced at high rotational speeds.

2. The transducer of claim 1 wherein said flow disturbing means comprises a plurality of circumferentially spaced projections.

3. The transducer of claim 2 wherein said edge of each of said projections is substantially parallel to the axis of said rotor.

4. The transducer of claim 1 wherein the side walls of the projections opposing the direction of flow in said chamber extend substantially radially inwardly from the wall of said chamber.

5. The transducer of claim 1 wherein the side wall of the projection next adjacent said inlet in the direction of flow in said chamber extends substantially radially inwardly from said outer wall.

6. The flow transducer of claim 1 wherein said chamber defines a primary portion of substantially cylindrical shape in which said rotor is mounted for rotation and a secondary portion offset axially from said primary portion and having a lesser diametral dimension than said primary portion, and wherein said outlet means is coupled with the secondary portion of said chamber.

7. The flow transducer of claim 5 wherein each of the blades of said rotor has rounded peripheral portion, said rounded portion being in a plane which includes the rotor axis.

8. The flow transducer of claim 1 wherein the indicator means comprises means for directing a beam of energy along a path intersected intermittently by the rotating rotor blades and means positioned to receive the energy beam and detect interruptions thereof.

9. The flow transducer of claim 1 wherein the rotor is constructed of material of specific gravity substantially equal to that of the fluid.

10. The flow transducer of claim 9 wherein the rotor is mounted on a shaft extending along said central axis, the housing defining respective bearing means mounted adjacent said chamber to engage opposite ends of said shaft, said fluid outlet means having an opening thereto located adjacent to one of the bearing means.

11. The transducer of claim 1 wherein said rotor further comprises an inverted bell-shaped element surrounding said central axis and forming a cavity open to the bottom of said rotor, said blades affixed to and extending outwardly from said bell-shaped element, said central axis being so oriented to entrap vapors from said fluid in said cavity in said bell-shaped element when said rotor rotates as said fluid flows through said chamber, said bell-shaped element and said rotor being so constructed as to entrap an amount of vapor sufficient to buoy said rotor in said fluid thereby to substantially equate the net specific gravity of said rotor to the fluid flowing through said chamber.

12. The flow transducer of claim 1 wherein the rotor has a plurality of tabs extending radially outwardly from the peripheral portion thereof, and wherein said indicator means comprises means for directing a beam of energy along a path intersected intermittently by the tabs as said rotor rotates and means positioned to receive the energy beam and detect interruptions thereof.

13. A flow transducer comprising:
   a. housing means defining a fluid flow chamber and fluid input and outlet means positioned to establish a substantially circular flow pattern about an axis within said chamber, said chamber having a peripheral wall spaced from and surrounding said axis;
   b. a bladed rotor mounted within said chamber for rotation about the axis in said chamber by fluid flowing therein;
   c. electrical indicator means mounted in said housing adjacent to said chamber for detecting the angular frequency of rotation of said rotor; and,
   d. a plurality of projections having a triangular cross-section extending inwardly from and spaced around the peripheral wall of said chamber, said projections having their inner terminus adjacent to the ends of the rotor blades to produce turbulence in the flow pattern around said chamber thereby inhibiting the rotational speed of said rotor.

14. The flow transducer of claim 13 wherein the chamber is substantially cylindrical.

15. The flow transducer of claim 14 wherein the input means is positioned to inject fluid into the chamber substantially tangentially thereof and the outlet means is positioned along the axis of the chamber to establish a helical flow pattern toward the center of the chamber.

16. The flow transducer of claim 15 wherein the chamber includes a primary portion of substantially cylindrical shape and in which the rotor rotates, and a secondary portion offset axially from the primary portion and having a lesser diametral dimension than the primary portion, and wherein the outlet means is coupled with the secondary portion of the chamber.

17. The flow transducer of claim 16 wherein the indicator means comprises means for directing a beam of energy along a path intersected intermittently by the rotating rotor blades and means positioned to receive the energy beam and detect interruptions thereof.

* * * * *